July 27, 1948. B. E. HOUSE 2,445,882
SEALING MEANS

Filed Dec. 10, 1943 2 Sheets-Sheet 1

INVENTOR
BRYAN E. HOUSE
BY

July 27, 1948.     B. E. HOUSE     2,445,882
SEALING MEANS
Filed Dec. 10, 1943     2 Sheets-Sheet 2
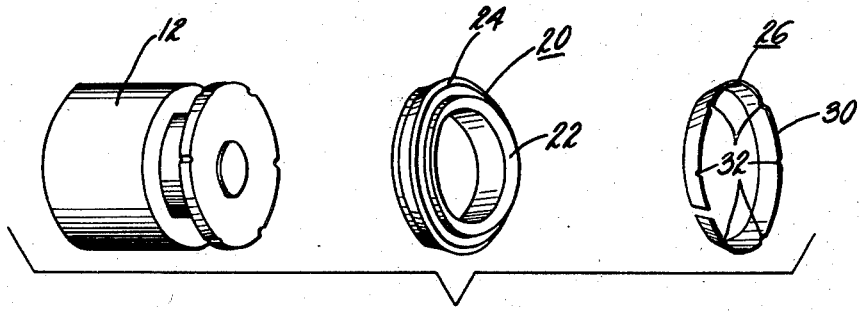
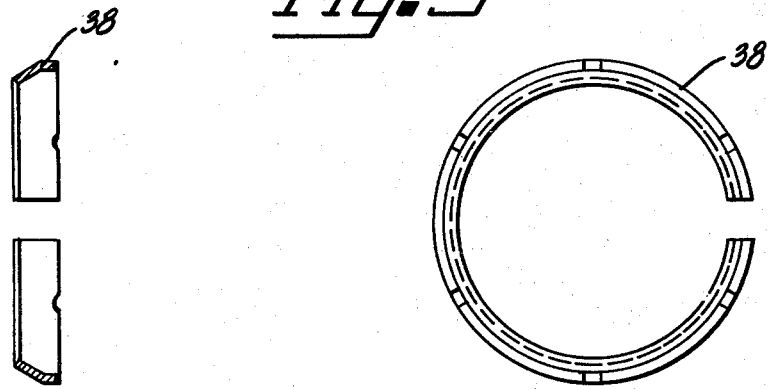
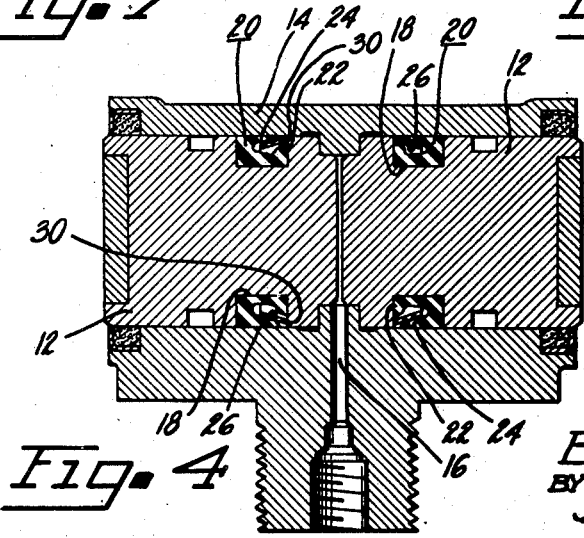
INVENTOR
BRYAN E. HOUSE
BY Patented July 27, 1948

2,445,882

UNITED STATES PATENT OFFICE 2,445,882

SEALING MEANS

Bryan E. House, South Bend, Ind., assignor to Bendix Aviation Corporation, South Bend, Ind., a corporation of Delaware Application December 10, 1943, Serial No. 513,684

9 Claims. (Cl. 309—33)

This invention relates to sealing means, particularly for use with cylinder-piston combinations, and is most directly concerned with sealing means of the type having a deformable sealing lip.

In the sealing of hydraulic cylinders for brake applying systems and the like, it has been found that, possibly due to inferior rubber available for piston seals, the resilience of the outer sealing edge or lip of said seals, which in the past has been relied upon to press against the cylinder wall and give satisfactory sealing, tends to disappear with aging of the seal, permitting the lip thereof to "take a set." This means that the lip no longer tends to spring outwardly against the cylinder wall, with the result that leaks are sometimes experienced.

Heretofore, means have been provided for urging the outer lip of the seal into close contact with the cylinder wall. Such means, usually referred to as an "expander," have been used in conjunction with a seal having the form of a cup and positioned on the head of the piston. The expander in such a case is constituted by a generally cup-shaped metal member having its outer portion slit to form a plurality of fingers. These fingers were held by suitable means against the lip of the sealing cup, holding it in close contact with the cylinder wall. The fingers were forced against the lip of the sealing cup either by a compression spring acting axially against the flat central portion of the expander, or by the inherent resilience of the fingers themselves acting as individual cantilever springs. In either case, a substantial portion of the thrust on the lip of the sealing cup acted in an axial direction, and thus was ineffective in pressing the lip against the cylinder wall.

An object of the present invention is to provide improved means for holding the lip of a seal in close sealing contact with the surface to be sealed.

A further object of the present invention is to provide an improved expander, improved both from the standpoint of simplicity and cost, and from the standpoint of effectiveness.

A still further object of the present invention is to provide an expander which can be used with an annular seal which fits into an annular groove in the outer cylindrical surface of a piston or the like.

Other objects and advantages of the present invention will become apparent during the course of the following description; reference being had therein to the acompanying drawings, in which:

Fig. 3 is a perspective view of the expander, seal, and piston preparatory to assembling the same;

Fig. 4 is a section taken through a cylinder and piston assembly showing the expander in assembled position;

Fig. 7 is a section taken through an expander illustrating still another embodiment of my invention; and Fig. 8 is an end view of the expander of Fig. 7.

Figure 1:
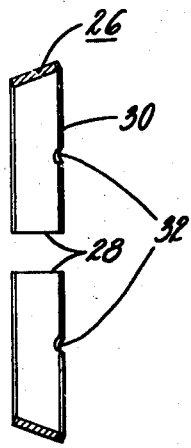
Fig. 1 is a section taken through an expander incorporating the principles of my invention.

In order to illustrate a possible use of my improved sealing means, I have shown in Fig. 4 a hydraulic wheel cylinder for brakes, to which the invention might be applied. Obviously the invention is usable regardless of the particular type of cylinder or use of the same which is contemplated.

The cylinder and piston combination of Fig. 4 comprises one or more pistons 12 reciprocable in the bore of a cylinder 14. Hydraulic liquid is admitted to the cylinder through the passage 16, and pressure of the liquid on the pistons moves them outwardly to actuate a brake or like device.

Each of the pistons 12 has an annular groove 18 in the outer cylindrical surface thereof, in which is located an annular resilient seal 20 made of deformable material, such as rubber. The purpose of the seals 20 is to prevent leakage of liquid from the cylinder along the outer surface of the pistons. In order to effectively prevent such leakage, each seal is preferably provided with an inner lip 22 extending radially outward and an outer lip 24 lying along the cylinder wall and extending axially toward the center of the cylinder.

The lips 22 and 24 of each seal 20 are initially so formed as to be urged by their inherent resilience against the respective sealed surfaces. For example, referring to Fig. 3, the outer lip of the seal 20 is seen to have a diameter greater than the diameter of the cylinder prior to assembling of the parts. Thus, in order to assemble the parts it is necessary to force the seal into the cylinder, compressing its outer lip. This expedient, of course, tends to give an effective seal because of the initial pressure of the lip against the cylinder wall.

The effectiveness of the seal is also improved by the pressure of the liquid acting against the sealing lip and thereby holding it in close contact with the cylinder wall.

However, in spite of the factors tending to give effective sealing, leakage past seals of this type has been encountered. The reason is, as explained above, that the lip of the seal, as it ages, tends to lose its resilience, and "take a set" corresponding to the diameter of the cylinder.

In order to provide a seal which will be effective at all times, I utilize a resilient member for exerting a constant force against the sealing edge or lip of the seal. In the illustrated embodiments of my invention, this resilient member is an "expander," since it urges the outer lip of the seal outwardly into contact with the cylinder wall. However, the principles of my invention would be equally applicable to a device intended to urge an inner sealing edge inwardly into contact with a sealed surface, and additionally other applications of the principles of my invention might be made.

Figure 2:
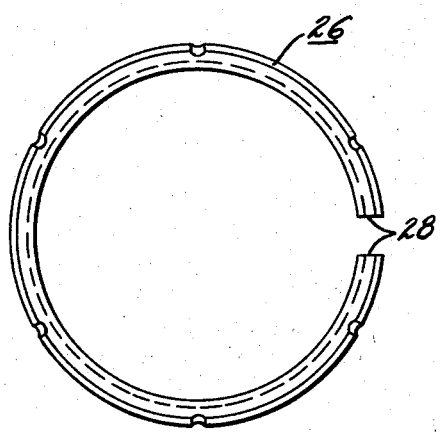
Fig. 2 is an end view of the expander of Fig. 1.

The expander in the present illustration, as, for example, in Figs. 1 and 2, is constituted by a resilient metal annulus or ring 26, split axially at 28 to permit circumferential expansion of the ring under the influence of its own inherent resilience, the ring being radially and circumferentially compressed during the assembling of the cylinder, in order that its resilience will tend to expand it and thus press against the sealing edge or lip of the seal. The ring 26 is shown in contracted position in Fig. 4, wherein it is assembled with the seal and piston.

In order that the annulus 26 may contact the seal only at the forward edge of the lip of the seal, I prefer that the annulus be of substantially conical form, as shown. The single line contact between the annulus and the lip of the seal concentrates the outward force of the expander at the place where it is needed, and thus, has the optimum effect on the effectiveness of the seal.

Because of the annular form of the expander, and its direct radial action on the lip of the seal, it is possible to position it in the annular groove of the piston. Expanders of the type heretofore used, and discussed above, could not be used with this type of piston and seal construction, i. e., with the annular seal positioned in a circumferential groove of the piston.

The expander is prevented from slipping forward by the contact of its front edge 30 with the front wall of the piston groove, as shown, it being necessary that a retaining wall of some sort be provided.

It is preferred that the original size of the split 28 be such that, even after the ring has been contracted in assembling, the split will provide a passage for liquid between the chamber in front of the piston and the annular groove. However, in order to insure that liquid will at all times be able to pass by the expander (even though the material forming the seal should swell), and particularly to insure that air can be bled at or near the top of the cylinder, I cut a plurality of circumferentially spaced notches 32 in the forward edge of the expander, i. e., the edge which contacts the wall of the piston groove. Although the opening provided by the split in the ring constitutes an exit passage for the air during bleeding, in certain installations, this opening is not at the top of the cylinder, which is the best point for bleeding out air.

Figure 5:
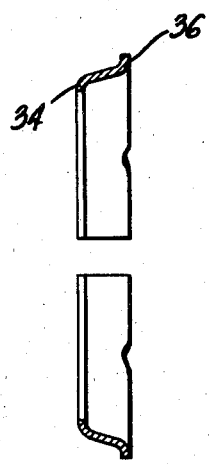
Fig. 5 is a section taken through an expander illustrating another embodiment of my invention.
Figure 6:
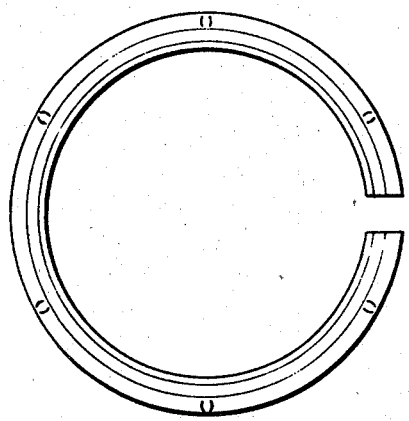
Fig. 6 is an end view of the expander of Fig. 5.

As shown in Figs. 5 and 6, the front and rear edges of the expander may be flanged-over to give added stiffness and strength, the rear edge being flanged inwardly, as at 34, and the front edge being flanged outwardly, as at 36.

If the lip of the seal is extremely thin, as in the smaller diameter cylinders, the front edge of the expander can extend axially forward to avoid contacting the cylinder wall, as shown at 38 in Figs. 7 and 8.

Although certain particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. Sealing means, for a cylinder and a piston having an annular groove in its outer cylindrical surface, comprising an annular resilient seal having inner and outer sealing lips, and an expander adapted to urge the outer lip of said seal radially outwardly into tight contact with the cylinder wall, said expander being constituted by an annular resilient metal strip split to permit circumferential expansion of the strip under the influence of its inherent resilience, said resilient metal strip being retained in position by contact of its forward edge with the forward side of the groove in the piston, the forward edge of the metal strip having a plurality of notches cut therein to permit the ingress and egress of fluid to and from the annular piston groove.

2. For use with a seal having an axially extending sealing lip, an expander, adapted to urge said sealing lip radially outwardly into sealing position, comprising an annular resilient metal strip split axially to permit circumferential expansion of the strip under the influence of its inherent resilience, said annular metal strip having a conical body portion which engages the sealing lip and having an outwardly extending flanged-over front edge and an inwardly extending flanged-over rear edge.

3. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, the inside rearward portion of said outer lip being relieved with respect to the metal ring, thereby providing localized contact between the metal ring and the forward inside edge of the outer lip.

4. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, the inside rearward portion of said outer lip being relieved with respect to the metal ring, thereby providing localized contact between the metal ring and the forward inside edge of the outer lip, the metal ring being spaced from the inner lip to enable the lips to expand without causing congestion.

5. In a cylinder and piston arrangement, said piston having an annular groove in its outer surface, sealing means comprising a ring-shaped member located in said groove having a base portion resting against the rear wall of said groove and reslient inner and outer lips extending forwardly from the base portion and lying respectively against the wall of the groove and the wall of the cylinder, and a split resilient metal ring holding the outer lip in tight contact with the cylinder wall, said metal ring being retained in position by contact of its forward edge with the front wall of the groove.

6. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, said metal ring being conical in form and having its large diameter edge in contact with the front wall of the groove and its small diameter edge in the space between said inner and outer lips, the inside front edge of the outer lip being in contact with the outer surface of the metal ring between the forward and rearward edges of said ring.

7. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, said metal ring being conical in form and having its large diameter edge in contact with the front wall of the groove and its small diameter edge in the space between said inner and outer lips.

8. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, said metal ring being conical in form and the inside front edge of the outer lip being in contact with the outer surface of the metal ring between the forward and rearward edges of said ring.

9. In a cylinder and piston arrangement, said piston having an annular groove in its outer surface, sealing means comprising a ring-shaped member located in said groove having a base portion resting against the rear wall of said groove and resilient inner and outer lips extending forwardly from the base portion and lying respectively against the wall of the groove and the wall of the cylinder, and a split resilient metal ring holding the outer lip in tight contact with the cylinder wall, said metal ring being conical in form for at least a portion of its length, and the inside front edge of the outer lip being in contact with the outer surface of the metal ring between the forward and rearward edges of said ring.

BRYAN E. HOUSE.

REFERENCES CITED

The following references are of record in the file of this patent:

UNITED STATES PATENTS

| Number | Name | Date |
|---|---|---|
| 984,888 | Christensen | Feb. 21, 1911 |
| 1,079,404 | DeWein | Nov. 25, 1913 |
| 1,316,534 | Cox | Sept. 16, 1919 |
| 1,640,155 | Low | Aug. 23, 1927 |
| 1,541,944 | Guerlay | June 16, 1925 |
| 2,220,993 | Christensen | Nov. 12, 1940 |
| 2,319,392 | Dick | May 18, 1943 |